Feb. 16, 1954

C. G. DUDIS ET AL 2,669,331

MOTOR CLUTCH

Filed April 20, 1950

INVENTORS
CHARLES G. DUDIS &
JOHN F. DENLINGER

BY Carl Beust
Henry Silberis

THEIR ATTORNEYS

Patented Feb. 16, 1954

2,669,331

UNITED STATES PATENT OFFICE 2,669,331

MOTOR CLUTCH

Charles G. Dudis and John F. Denlinger, Dayton, Ohio, assignors to The National Cash Register Company, Dayton, Ohio, a corporation of Maryland Application April 20, 1950, Serial No. 157,042

7 Claims. (Cl. 192—17)

This invention relates to improvements in motor clutches for accounting machines and the like.

The invention includes a spring clutch to clutch start-and-stop motors to machines of the class which are operated intermittently. The motor for such a machine is normally idle and unclutched from the machine. Upon release of the machine for operation, the motor is simultaneously clutched to the driving mechanism of the machine, and a switch in the electric circuit for the motor is closed to start the motor operating. At the end of the complete operation of the machine, the switch is opened to stop the motor, and, at the same time, the motor is unclutched from the operating mechanism. In clutches heretofore provided for start-stop machines, the clutching element becomes worn due to the repeated start and stop operations. The clutch mechanism disclosed herein is a novel clutching element consisting of a coil spring on, and spanning, a driven element and a driving element. The spring is held in contact with the driving element, but not with sufficient force to cause appreciable friction. When the clutch is released to become effective, the movement of the driving element tends to wind the clutch spring around the driving element to reduce its diameter so as to tightly grip upon the driving element, resulting in the driving of the clutch spring, one end of which is secured to the driven element. The spring clutch also tightly grips the driven element so that the latter is driven by the driving element through the clutch spring. When it is desired to unclutch the driving element from the driven element, to arrest movement of the driven element, a stop is positioned in the path of one end of the clutch spring to arrest said end, which tends to unwind the clutch spring and release its grip on the driving element, whereupon the latter is free to rotate independently of the driven element. After the clutch spring has been unwound, a switch through the electric motor is opened, and the driving element is positively arrested by the stopping means.

The principal object of the invention is to provide a spring clutch, for a start-stop machine, which is simple in construction and positive in action, one in which there is no appreciable wear, and one in which a minimum of "break-away" torque is required to disengage the clutch.

A specific object of the invention is to provide a clutch embodying the use of a coil spring for the clutching element.

With these and incidental objects in view, the invention includes certain novel features of construction and combinations of parts, a preferred form of which is hereinafter described with reference to the drawings which accompany and form a part of this specification.

General description

The invention is illustrated herein as applied to a machine of the class illustrated in United States Patents Nos. 1,144,418, issued to William A. Chryst on June 29, 1915, and No. 1,840,639, issued to Bernis M. Shipley on January 12, 1932, and particularly to the latter.

In machines of the class disclosed in the above-mentioned patents, the machine and the driving motor therefor are normally at rest. Operations of such machines are initiated by depression of a release key which renders the clutch effective to clutch the motor to the main shaft of the machine and simultaneously closes a switch through the power circuit for the motor to start the motor operating. At the end of the machine operation, the switch in the power circuit is opened and the clutch is released, whereupon a fixed stop arrests the main shaft of the machine in home position.

The clutch disclosed herein consists of a coil spring positioned around a driving element and a driven element, and one end of the coil spring is secured to the driven element. The coil spring has an inside diameter of such a size that the spring tends to wrap itself around the driving element and the driven element. However, when the motor is at rest, the free end of the coil spring engages a stop which holds the spring in slightly unwound condition, so that the coil spring is held out of gripping engagement with the driving element. When a machine release key is operated, a stop is withdrawn from engagement with the free end of the coil spring, whereupon it is released to permit the spring to frictionally engage the driving element. Thereafter, when the motor is energized and the driving element is operated, the rotating movement of the driving element tends to wrap the coil spring tighter around the driving element to provide an effective driving connection.

Detailed description

Figure 2:
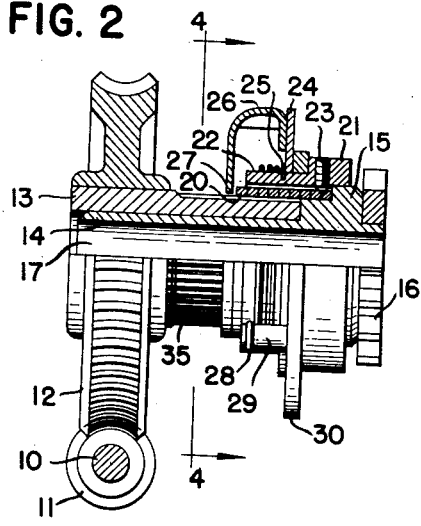
Fig. 2 is a side view, partly in cross section, of the clutch mechanism.
Figure 3:
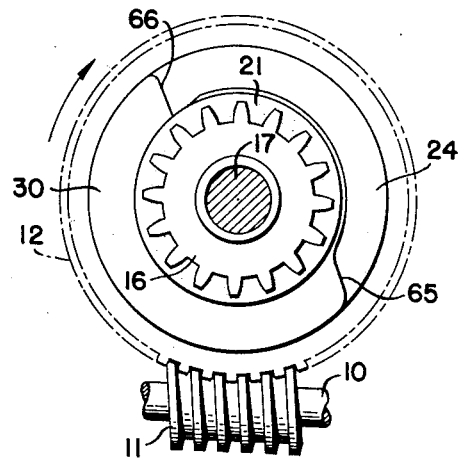
Fig. 3 is an end view of the clutch mechanism shown in Fig. 2, looking from the right side thereof.

The electric motor (not shown) is provided with an armature shaft 10 (Figs. 2 and 3), upon which is mounted a worm gear 11, meshing with a worm gear 12, secured on a driving element 13 in the form of a hollow shaft. The driving element 13 is rotatably mounted on a driven element 14, also in the form of a hollow shaft, which is formed on an extension of a hub 15, to the latter of which is secured a driving pinion 16, which pinion meshes with a gear on the main shaft of the machine. The driven member 14 is rotatably mounted on a stud 17, suitably mounted on the framework 19 of the machine, which stud supports the clutch mechanism. Mounted on the driving element 13 is a clutch in the form of a coil spring 20, which spring also is supported on a shoulder formed on the hub 15, as shown in Fig. 2. The coil spring 20 is wound of spring wire which is rectangular in cross section to provide a flat inner surface for engagement with the driven element and the driving element, respectively. Secured to the hub 15 is a shouldered collar 21, having a reduced portion 22 extending over the coil spring 20, as shown in Fig. 2. The right-hand end of the coil spring 20 (Fig. 2) is securely held on the shoulder of the hub 15 by a set screw 23 passing through a threaded opening in the collar 21, whereby the coil spring 20 is securely attached to the driven member 14.

Figure 1:
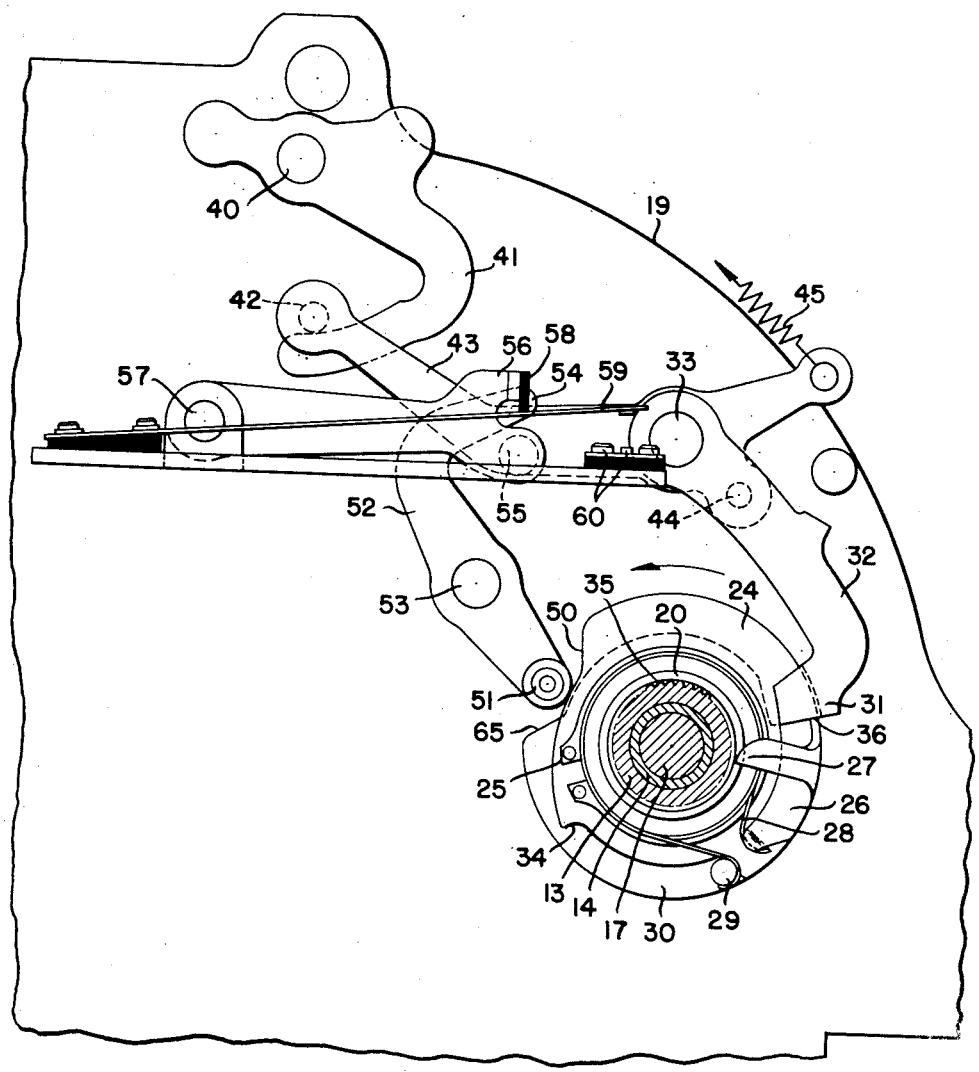
Fig. 1 is a side view of the machine showing the controls for rendering the clutch effective for operating the machine through one complete operation.

Rotatably mounted on the reduced portion 22 of the collar 21 is a disk 24. A retaining washer 25 maintains the disk 24 in its longitudinal position on the reduced portion 22. A plate 26 (Figs. 1, 2, 4, and 5) is secured to the disk 24 and is formed to provide a downwardly-extending finger 27, which normally engages the free end of the coil spring 20, as illustrated in Fig. 1. The lower end of the plate 26 is formed with an ear, to which one end of a spring 28 is attached, which spring is coiled around the reduced portion 22 of the collar 21, and the other end is formed to engage a stud 29 mounted on a cam disk 30 secured to the collar 21. The spring 28 normally tends to rotate the plate 26 and the disk 24 in a counter-clockwise direction (Fig. 1) but is normally held in the position shown in Fig. 1 by the lower end 31 of an arm 32, pivotally mounted on a stud 33 on the framework 19. The spring 28 normally maintains the upper end (Fig. 1) of the plate 26 in engagement with said lower end 31 of the arm 32.

Figure 4:
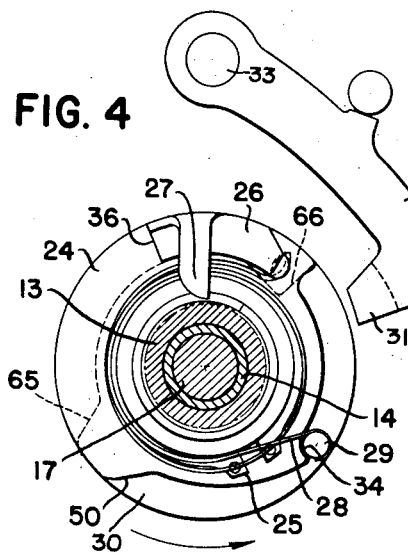
Fig. 4 is an elevational view of the clutch mechanism taken on line 4—4 of Fig. 3, and looking in the direction of the arrows, and with the clutch shown in clutching position.
Figure 5:
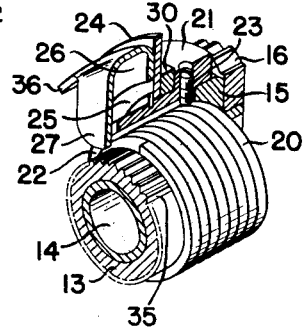
Fig. 5 is a perspective view of the spring clutch member, together with certain control elements therefor, and illustrates the clutch spring in its clutching position.

When the machine is released for operation in the manner hereinafter described, the arm 32 is rocked counterclockwise to withdraw the end 31 from engagement with the plate 26, thus permitting the spring 28 to rock the disk 24 counter-clockwise until a shoulder 34 thereon is arrested by the stud 29, as shown in Fig. 4. This counter-clockwise movement of the disk 24 withdraws the finger 27 from engagement with the free end of the coil spring 20, thus permitting the coil spring to frictionally engage the driving element 13.

In order to obtain a better gripping action by the spring 20 on the driving element 13, the driving element 13 is provided with a plurality of small grooves 35 on its periphery. In addition to providing a better gripping action, the grooves 35 also prevent excessive wear on the driving element 13 due to the residue of lubricant retained in each groove.

At the time the arm 32 is rocked counter-clockwise (Fig. 1), a switch through the motor power circuit is closed, in a manner hereinafter described, to start the shaft 10 rotating and through the worm gears 11 and 12 rotate the driving element 13. The counter-clockwise rotation of the driving element 13 after the spring 20 has been released by the withdrawal of the finger 27 causes the frictional engagement between the driving element 13 and the spring 20 to tend to further wrap the spring 20 around the driving element, thus providing a tight gripping action between these two elements. This gripping, or winding, action of the spring 20 also tends to tightly wrap the right-hand end (Fig. 2) of the spring 20 around the shouldered portion of the hub 15, thus more effectively gripping the driving element 14. This provides a driving connection between the driving element 13 and the driven element 14, whereupon the pinion 16 is rotated to drive the main shaft of the machine in a counter-clockwise direction. This is normally prevented by the engagement of a stud 42, thereon with an arm 41 secured to a release shaft 40. However, upon the releasing movement of the release shaft 40, in a manner described in the above patents, the arm 41 is withdrawn from beneath the stud 42, whereupon a spring 45 rocks the arm 43 and through the connecting stud 44 rocks the arm 32 counter-clockwise to withdraw the end 31 from the end of the plate 26, thus permitting the disk 24 to be rocked by the spring 28 until the shoulder 34 thereon is arrested by the stud 29.

Counter-clockwise rotation of the disk 44 brings a cam surface 50 thereon in engagement with a stud 51 carried by an arm 52 pivoted on a stud 53. The arm 52 is provided with a finger 54, which normally overlies a roller 55, carried by a switch-operating arm 56, pivoted on a stud 57. The free end of the arm 56 is provided with a block 58 of insulating material, which normally engages a switch blade 59 comprising one contact member of a switch in an electric circuit through the motor.

When the cam surface 50 engages the stud 51 and rocks the arm 52 on the stud 53, the finger 54 thereon engages the roller 55 and lowers the switch arm 56 to bring the switch blade 59 into contact with a stationary switch contact 60 to close a circuit through the electric motor, thereby causing the motor to rotate.

As illustrated in the above-mentioned Shipley patent, near the end of machine operation, the mechanism becomes effective to restore the arm 32 into the normal position shown herein in Fig. 1, whereupon the release shaft 40 is restored to its home position to again position the arm 41 beneath the stud 42, thus holding the arm 32 in its home position. The movement of the arm 32 into its home position is effected just before the complete operation of the machine, and therefore, when the plate 26 approaches its home position, the end 31 of the arm 32 is in position to arrest the plate 26 and the disk 24. Arresting the plate 26 causes the cam surface 50 to be held in the position shown in Fig. 1 and permits the stud 51 to ride down a cam surface 65 to permit the switch blade 59 to restore to its open position. The switch blade 59 is constructed of spring metal and therefore is effective to restore the arm 52 to its home position.

When the disk 24 is released to the action of its spring 28 in the manner before described, the cam surface 50 is moved beyond the cam surface 65 to thereby present a continuous periphery to the roller 51, which is long enough to span the peripheries of both disks 24 and 30. When, near the end of machine operation, the disk 24 is arrested by the end 31 of the lever 32 and the disk 30 continues to rotate, the cam surfaces 50 and 65 are moved relative to each other to provide the space for the roller 51, so that the arm 52 can be restored to its normal position.

When the disk 24 is arrested by the arm 32 near the end of machine operation, the finger 27 (Fig. 1) is also arrested and therefore provides a positive stop for the free end of the clutch spring 20, and continued rotation of the driving element 13 causes the spring 20 to be unwound, thus releasing the driving spring 20 therefrom. This disconnects the driving element from the driven element to arrest movement of the gear 16 and, therefore, the main shaft of the machine.

In order to provide a positive stop for the gear 16 to be certain that the machine is arrested in its home position, the cam disk 30 is provided with a stop shoulder 66, which comes into engagement with the end 31 of the arm 32 shortly after the plate 26 engages said end 31. The end 31 of the arm 32 is bifurcated to straddle the disk 24, so that the end 31 of the lever arm 32 can be engaged by both the plate 26 and the stop shoulder 66.

When the arm 32 is moved into its home position, shown in Fig. 1, its end 31 arrests the plate 26 and the finger 27, thus providing a stop for the end of the spring 20, which is in fixed relationship with the home position of the main shaft of the machine. This relationship is maintained by the end 31 of the arm 32, which also acts as a stop for the cam plate 30. Therefore, when the machine comes to rest, the clutch spring 20 and the main shaft of the machine are in proper spaced relationship to begin a new operation. The result is obtained by the single arm 32 coacting with the plate 26 and the shoulder 66 on the cam disk 30, and provides a simple and effective means for controlling the time of unclutching the motor from the main shaft of the machine at the proper time to arrest the main shaft in its exact home position.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a clutch mechanism for connecting a motor to a machine of the class which is started and stopped for each operation, the combination of a driving element operated by the motor; a driven element; a spring clutch spanning the driving element and the driven element, one end of said spring clutch being secured to the driven element and the other end of the spring clutch being disconnected from both elements, said spring clutch tensioned to frictionally engage both of said elements to clutch the elements together; a collar secured to said driven member and spanning the outside periphery of said spring clutch; a disk rotatably mounted on said collar; a stop on the disk extending into the path of movement of the said other end of the spring clutch and normally engaging the said other end of the spring clutch to maintain the spring clutch out of engagement with the driving element; and means to withdraw the stop from engagement with the said other end of the spring clutch to allow the spring clutch to frictionally engage both of said elements whereby the driving element operates the driven element.

2. In a clutch mechanism for connecting a motor to a machine of the class which is started and stopped for each operation, the combination of a driving element operated by the motor; a driven element; a spring clutch spanning the driving element and the driven element, one end of said spring clutch being secured to the driven element and the other end of the spring clutch being disconnected from both elements, said spring clutch tensioned to engage both of said elements to clutch the elements together; a collar secured to said driven element; a cylindrically-formed extension on said collar spanning the periphery of the spring clutch; a spring-tensioned disk rotatably mounted on said extension; a stop mounted on said disk normally engaging the said other end of the spring clutch to maintain the spring clutch out of engagement with the driving element; and means to release the spring-tensioned disk to thereby move the stop from engagement with said other end of the spring clutch to allow the spring clutch to frictionally engage both of said elements to connect the elements together.

3. In a clutch mechanism for connecting a motor to a machine of the class which is started and stopped for each operation, the combination of a driving element operated by the motor; a driven element; a spring clutch spanning the driving element and the driven element, one end of said spring clutch being secured to the driven element and the other end of the spring clutch being disconnected from both elements, said spring clutch tensioned to engage both of said elements to clutch the elements together; a stop normally engaging the other end of the spring clutch to maintain the spring clutch out of engagement with the driving element; and a spring-tensioned control disk to withdraw the stop from engagement with the said other end of the spring clutch to release the spring clutch to allow the spring clutch to frictionally engage both of said elements to connect the elements together for operation.

4. In a clutch mechanism for connecting a motor to a machine of the class which is started and stopped for each operation, the combination of a driving element operated by the motor; a driven element; a spring clutch spanning the driving element and the driven element, one end of said spring clutch being secured to the driven element and the other end of the spring clutch being disconnected from both elements, said spring clutch tensioned to engage both of said elements to clutch the elements together; a stop normally engaging the said other end of the spring clutch to maintain the spring clutch out of engagement with the driving element; means to move the stop to release the spring clutch to allow the spring clutch to engage both of said elements frictionally to thereby connect the two elements, whereby the driving element operates the driven element; and means to return the stop to original position to engage said other end of the spring clutch and thereby disengage the spring clutch from said driving element and to simultaneously arrest the driven element in stopping position, said means thereby positioning the said other end of the spring clutch and the driven element in certain positions relatively to each other.

5. In a clutch mechanism for connecting a motor to a machine of the class which is started and stopped for each operation, the combination of a driving element operated by the motor; a driven element; a spring clutch spanning the driving element and the driven element, one end of said spring clutch being secured to the driven element and the other end of the spring clutch being disconnected from both elements, said spring clutch tensioned to engage both of said elements to clutch the elements together; a stop normally engaging the other end of the spring clutch to maintain the spring clutch out of engagement with the driving element; means to withdraw the stop from engagement with the said other end of the spring clutch to allow the spring clutch to frictionally engage both of said elements whereby the driving element operates the driven element; and means to return the stop to original position to engage the said other end of the spring clutch and thereby disengage the spring clutch from said driving element and to simultaneously arrest the driven element in stopping position, said means thereby positioning the said other end of the spring clutch and the driven element in certain positions relatively to each other.

6. In a clutch mechanism for connecting a motor to a machine of the class which is started and stopped for each operation, the combination of a driving element operated by the motor; a driven element; a spring clutch spanning the driving element and the driven element, one end of said spring clutch being secured to the driven element and the other end of the spring clutch being disconnected from both elements, said spring clutch tensioned to engage both of said elements to clutch the elements together; a stop normally engaging the said other end of the spring clutch to maintain the spring clutch out of engagement with the driving element; and means to release the stop from engagement with said other end of the spring clutch to frictionally engage both of said elements to connect the elements together, said means movable into position to restore the stop into engageable position with said other end of the spring clutch to release the spring clutch from engagement with the driving element and to simultaneously arrest the driven element when the driven element reaches the starting position, to thereby maintain the said other end of the spring clutch and the driven member in predetermined relative positions.

7. In a clutch mechanism for connecting a motor to a machine of the class which is started and stopped for each operation, the combination of a driving element operated by the motor; a driven element; a spring clutch spanning the driving element and the driven element, one end of said spring clutch being secured to the driven element and the other end of the spring clutch being disconnected from both elements, said spring clutch tensioned to engage both of said elements to clutch the elements together; a stop normally engaging the said other end of the spring clutch to maintain the spring clutch out of engagement with the driving element; and means to withdraw the stop from engagement with the said other end of the spring clutch to release the spring clutch to frictionally engage both of said elements to connect the elements together for operation, said means adapted to restore the stop to original position in engagement with said stop.

CHARLES G. DUDIS.
JOHN F. DENLINGER.

References Cited in the file of this patent

UNITED STATES PATENTS

| Number | Name | Date |
| --- | --- | --- |
| 677,872 | Locke | July 9, 1901 |
| 1,144,418 | Kettering et al. | June 29, 1915 |
| 1,737,907 | Arnold | Dec. 3, 1929 |
| 1,840,639 | Shipley | Jan. 12, 1932 |
| 1,968,155 | Litchfield | July 31, 1934 |
| 2,298,970 | Russell | Oct. 13, 1942 |
| 2,468,193 | Goff | Apr. 26, 1949 |
| 2,475,432 | Marihart | July 5, 1949 |
| 2,487,280 | Starky | Nov. 8, 1949 |
| 2,533,848 | Swilik | Dec. 12, 1950 |
| 2,577,181 | Christensen | Dec. 4, 1951 |